United States Patent [19]

Bagley et al.

[11] Patent Number: 5,167,016
[45] Date of Patent: Nov. 24, 1992

[54] CHANGING CHARACTERS IN AN IMAGE

[75] Inventors: Steven C. Bagley; Ronald M. Kaplan, both of Palo Alto, Calif.; Wayland R. Hicks, New Canaan, Conn.; Daniel Davies, Palo Alto, Calif.

[73] Assignee: Xerox Corporation, Stamford, Conn.

[21] Appl. No.: 459,026

[22] Filed: Dec. 29, 1989

[51] Int. Cl.⁵ .............................................. G06F 15/20
[52] U.S. Cl. .................................. 395/144; 395/146; 364/419
[58] Field of Search ................ 364/518, 521, 419; 382/37, 57; 395/144, 151, 150

[56] References Cited

U.S. PATENT DOCUMENTS

| | | | |
|---|---|---|---|
| 3,259,883 | 7/1966 | Rabinow et al. | 340/146.3 |
| 3,611,291 | 10/1971 | Frank | 340/146.3 |
| 3,676,856 | 7/1972 | Manly | 340/172.5 |
| 3,709,525 | 1/1973 | Frank | 283/1 |
| 3,714,636 | 1/1973 | Manly | 340/172.5 |
| 3,763,471 | 10/1973 | Manly | 340/172.5 |
| 3,969,698 | 7/1976 | Bollinger et al. | 340/146.3 |
| 4,010,445 | 3/1977 | Hoshino | 340/146.3 |
| 4,516,262 | 5/1985 | Sakurai | 382/18 |
| 4,531,231 | 7/1985 | Crane et al. | 382/13 |
| 4,654,875 | 3/1987 | Srihari et al. | 382/40 |
| 4,727,588 | 2/1988 | Fox et al. | 382/13 |
| 4,797,855 | 1/1989 | Duncan, IV et al. | 364/900 |
| 4,811,412 | 3/1989 | Katsurada | 382/9 |
| 4,815,029 | 3/1989 | Barker et al. | 364/900 |
| 4,914,709 | 4/1990 | Rudak | 382/57 |
| 4,974,260 | 11/1990 | Rudak | 382/57 |
| 4,989,258 | 1/1991 | Takahashi et al. | 382/37 |
| 5,022,081 | 6/1991 | Hirose et al. | 381/43 |

OTHER PUBLICATIONS

Wong, K. Y., Casey, R. G., and Wahl, F. M., "Document Analysis System," *IBM Journal of Research and Development*, vol. 26, No. 6, Nov. 1982, pp. 647–656.

Casey, R. G., and Wong, K. Y., "Text Recognition Using Adaptive Software," *Globecom '85*, vol. 1, IEEE, 1985, pp. 353–357.

Suenaga, Y., and Nagura, M., "A Facsimile Based Manuscript Layout and Editing System by Auxiliary Mark Recognition," 5th International Conference on Pattern Recognition Proceedings, Dec. 1–4, 1980, vol. 2, pp. 856–858.

Suenaga, Y., "A Facsimile Based Text Editor Using Handwritten Mark Recognition," IJCAI-79: Proceedings of the Sixth International Joint Conference on Artificial Intelligence, Tokyo, Aug. 20–23, 1979, vol. 2, pp. 856–858.

Brickman, N. F., and Rosenbaum, W. S., "Word Autocorrelation Redundancy March (WARM) Technology," *IBM Journal of Research and Development*, vol. 26, No. 6, Nov. 1982, pp. 681–686.

Holt, M. J. J., and Xydeas, C. S., "Compression of Document Image Data by Symbol Matching," in Cappellini, V., and Marconi, R., Eds., *Advances in Image Processing and Pattern Recognition*, Elsevier Science Publishers, 1986, pp. 184–190.

*Primary Examiner*—Heather R. Herndon

[57] ABSTRACT

An existing character, in a text defined in image form by data such as a two-dimensional array, is copied to add a new character to the text. The existing character is found by performing character recognition on a two-dimensional data array defining an image that includes part of the text, such as a page. The array can be obtained from a scanner. A word that is recognized as including characters of the type needed is tested to determine whether it can be divided into the correct number of characters. The word is divided by finding connected components in the part of the array in which the word was found during recognition. The connected components are grouped into sets, each set being likely to be a character. If the word can be correctly divided, character-size arrays for its characters are obtained and saved. One of the arrays for the character type of the new character is selected and used to produce an array for the word in which it is included. The new word's array is then used to produce an array for a line in which the new word replaces an old word. The characters of the new word are spaced according to the spacing of the characters of the old word. The new character is positioned transverse to the line based on the transverse positioning of the existing character. The interword spaces of the line are adjusted. The line's array is then used to produce data defining a modified version of the text in image form.

40 Claims, 11 Drawing Sheets

XEROX operates a private long-distance telephone system called Intelnet. The (network) consists of 12 interconnected AT&T telephone switching centres with circuits to every major location in the United States, Europe, Canada and Mexico. Intelnet, when properly used, can be an (important) productivity tool, providing faster, more convenient and less expensive (telephone) service than the public long-distance networks.

XEROX operates a private long-distance telephone system called Intelnet. The network consists of 12 interconnected AT&T telephone switching centers with circuits to every major location in the United States, Europe, Canada and Mexico. Intelnet, when properly used, can be an important productivity tool, providing faster, more convenient and less expensive telephone service than the public long-distance networks.

*Fig. 7B*

CHANGING CHARACTERS IN AN IMAGE

BACKGROUND OF THE INVENTION

This invention was made with Government support under Contract No. N00140-86-C-8996 awarded by the Defense Advanced Research Projects Agency (DARPA). The Government has certain rights in this invention.

The present invention relates to techniques for operating on an image that includes text. More specifically, the invention relates to inserting, deleting, or otherwise changing characters in an image defined by a two-dimensional data array. For example, the characters of a word could be changed to correct its spelling.

Wong, K.Y., Casey, R.G., and Wahl, F.M., "Document Analysis System," *IBM Journal of Research and Development*, Vol. 26, No. 6, November 1982, pp. 647-656, describe a system, shown in FIG. 1, that assists a user in encoding printed documents for computer processing. An Image Manipulation Editor (IEDIT) described at pages 648-649 reads and stores images on disk and provides image-editing functions such as copy, move, erase, etc. As described at pages 649-656, a digitized printed document is segmented and classified into regions of text and images. Blocks containing text can be analyzed with a pattern-matching program that groups similar symbols from the document and creates a prototype to represent each group. During pattern matching, the position and matching prototype index for each text pattern is recorded; the position may be the coordinates of the lower left corner of the array representing the patern. The prototype patterns are identified interactively or by automatic recognition logic. Inclusion of a dictionary-checking technique is planned to help correct errors incurred during recognition.

Casey, R.G., and Wong, K.Y., "Text Recognition Using Adaptive Software," *Globecom '85*, Vol. 1, IEEE, 1985, pp. 353-357, describe techniques for entering optically scanned printed text into a computer by first extracting one or more examples of "prototypes" of each symbol on the page. The prototypes are post-analyzed to detect and separate merged characters, and then, in an interactive stage, are presented to an operator who keys in identity codes. In the interactive stage, the operator modifies the resulting text if necessary. Page 354 describes how characters are segmented. User interaction, described beginning at page 355, includes display of unresolved prototypes for the operator to key the identities; a contextual display of prototype displays for the operator to change the ID of any prototype; and highlighting words not present in a dictionary and offering a list of alternative spellings to detect identification errors and correct false matches.

Suenaga, Y., and Nagura, M., "A Facsimile Based Manuscript Layout and Editing System by Auxiliary Mark Recognition," *5th International Conference on Pattern Recognition Proceedings*, Dec. 1-4, 1980, Vol. 2, pp. 856-858, describe an editor whose only input device is a FAX transmitter and whose only output device is a FAX receiver. FIG. 1 shows components of the system, including OCR, and FIG. 2 shows the processing flow, which includes a text editing subsystem and a graphics editing subsystem. The text editing subsystem rearranges the binary picture of the text, as illustrated in FIGS. 4(a) and 4(b). Marginal distribution (profile) and horizontal connectivity are used to divide the text picture into Segmented Blocks (SBs), corresponding to the rectangular regions which cover the individual characters in Japanese texts, individual words in alphanumeric texts, or graphics to be processed as binary patterns. A Segmented Block List (SBL) is constructed and used to extract and classify marks based on topological and metric features. A Mark Parameters List for Texts (MPL-T) is constructed. A Picture Allocation List (PAL), a list consisting of the SB numbers and their linkage addresses, is generated according to the MPL-T and SBL. Character strings or patterns are virtually deleted, moved, copied, and combined in PAL. The binary picture of the original text is rearranged according to the PAL to construct the fair copy.

Brickman, N.F., and Rosenbaum, W.S., "Word Autocorrelation Redundancy Match (WARM) Technology," *IBM Journal of Research and Development*, Vol. 26, No.6, November 1982, pp. 681-686, describe facsimile technology that compresses an image of a textual document by complex symbol matching on both the word level and then the character level, as shown and described in relation to FIG. 1. The processing order shown in FIG. 1 is reordered slightly if the font is not known a priori, in which case the character level is done first to obtain the document's font.

Holt, M.J.J., and Costas, S.X., "Compression of Document Image Data by Symbol Matching," in Cappellini, V., and Marconi, R., Eds., *Advances in Image Processing and Pattern Recognition*, Elsevier Science Publishers, 1986, pp. 184-190, describe techniques for compressing typewritten and printed documents using a pattern-matching algorithm.

SUMMARY OF THE INVENTION

The invention provides techniques for changing characters in text appearing in an image. The image may, for example, be defined by a two-dimensional data array; such an array could be received from an image input device such as a scanner or camera, from a stored file, or from any other source. An array defining a character can be obtained from the same text and the character array can then be used in making a change.

One aspect of the invention is based on the observation of a fundamental problem in changing characters in text in an image. When the result of a change is that the text includes a new character that is not in the text prior to the change, the changed version of the image will be unsatisfactory unless the new character matches other occurrences of the same character type in the text. For example, if the new character is of a different typeface or a different point size than other occurrences of the same character type in the text, it will detract from the appearance of the text.

This aspect is further based on the discovery that this problem can often be solved by finding an existing character that already appears in the text and that is of the same character type as the new character. Data, such as a two-dimensional array, defining this existing character in substantially the same way as it is defined by the data defining the image in which it appears can be obtained automatically. The image in which the existing character appears may be the same as the image being modified or may be another image that includes another part of the same text, such as another page. A modified version of the imge being modified can then be produced in which the new character is defined in substantially the same way as the existing character was previously defined.

This solution can be implemented by performing character recognition on a two-dimensional array defining an image that includes part of the text. The recognition results can include spatial data indicating the positions of correctly spelled words within the array and identity data indicating the character types of characters they obtain. Using spatial data indicating the position of a correctly spelled word that includes the existing character, an intermediate two-dimensional array that includes the word can then be obtained. The two-dimensional array that defines the character can then be obtained automatically from this intermediate array.

Other closely related aspects of this invention are based on the observation that an existing character may be unsatisfactory even if it occurs in a correctly spelled word. For example, one or more of the word's characters may be poorly formed. Or a text may include more than one typeface or point size, so that some of the correctly spelled words will be inappropriate because they have the wrong typeface or point size. These problems can be alleviated in a number of ways.

One aspect of the invention alleviates the problem of poorly formed characters by testing a word before using its characters. The word's array can be analyzed to find the connected components within it, and the connected components can be grouped into sets each of which is likely to be a character according to appropriate criteria. If the number of component sets is not equal to the number of characters in the word, when it is likely that one or more of th characters is poorly formed, either by the breaking of a character into parts or by the joining of two characters. Therefore, the word is not used unless it has as many component sets as characters.

Another aspect of the invention alleviates the the problems of poorly formed characters and multiple typefaces or point sizes by selecting a character that is likely to be appropriate from a set of characters of the same character type that have been recognized. As they are obtained, the two-dimensional arrays for the characters of each character type can be compared. For characters that are almost identical, the first one found can be retained. For characters that are substantially different, both can be retained, and one can be selecteed for a particular new character. The selection could be made by a user. Also, contextual data could be saved for each character that is found, indicating its position, its typeface, its point size, or the like. Then, the contextual data could be used to select the two-dimensional array for a particular insertion.

Others aspects of the invention are based on the observation that some operations on text require more than simply adding a new character. For example, to perform spelling correction on text in image form, it is often necessary to replace or reorder a number of characters in a word, an operation that may include both deletions and insertions. But each deletion and insertion, if performed separately, requires respositioning of other characters, making the overall operation complex and subject to positioning errors. In addition, spelling correction or any other operation adding a new character to an existing word or deleting a character from an existing word may require additional corrections because other characters of the word are poorly formed.

One aspect of the invention is based on the discovery of a technique that can perform complex operations such as spelling correction and adding or deleting a character in an existing word in a text in image form. Rather than performing such operations on each character separately, the entire word can be deleted and replaced with a new word whose two-dimensional array is produced from data defining the text in image form. Spatial data indicating the spacing of the characters in the replaced word can be used in positioning the characters within the new word's array in a direction along the line. Spatial data indicating the position of each character's array relative to a baseline can be used in positioning the characters in a direction transverse to the line.

A related aspect is based on the observation that it is often necessary to reposition other words in a line in which a word is being replaced. This repositioning can be done by obtaining a two-dimensional array for the line in which interword spaces are adjusted so that the words, including the replacement word, are appropriately spaced. Word replacement can then be done by producing a modified version of the imge in which the line is defined as in its array. The following description, the drawings and the claims further set forth these and other objects, features and advantages of the invention.

BRIEF DESCRIPTION OF THE DRAWINGS

FIG. 7A shows a view of an image that includes text.

FIG. 7B shows a view of a modified version of the text of FIG. 7A in which misspelled words have been replaced by correctly spelled words according to the invention.

DETAILED DESCRIPTION

A. Conceptual Framework

Figure 1:
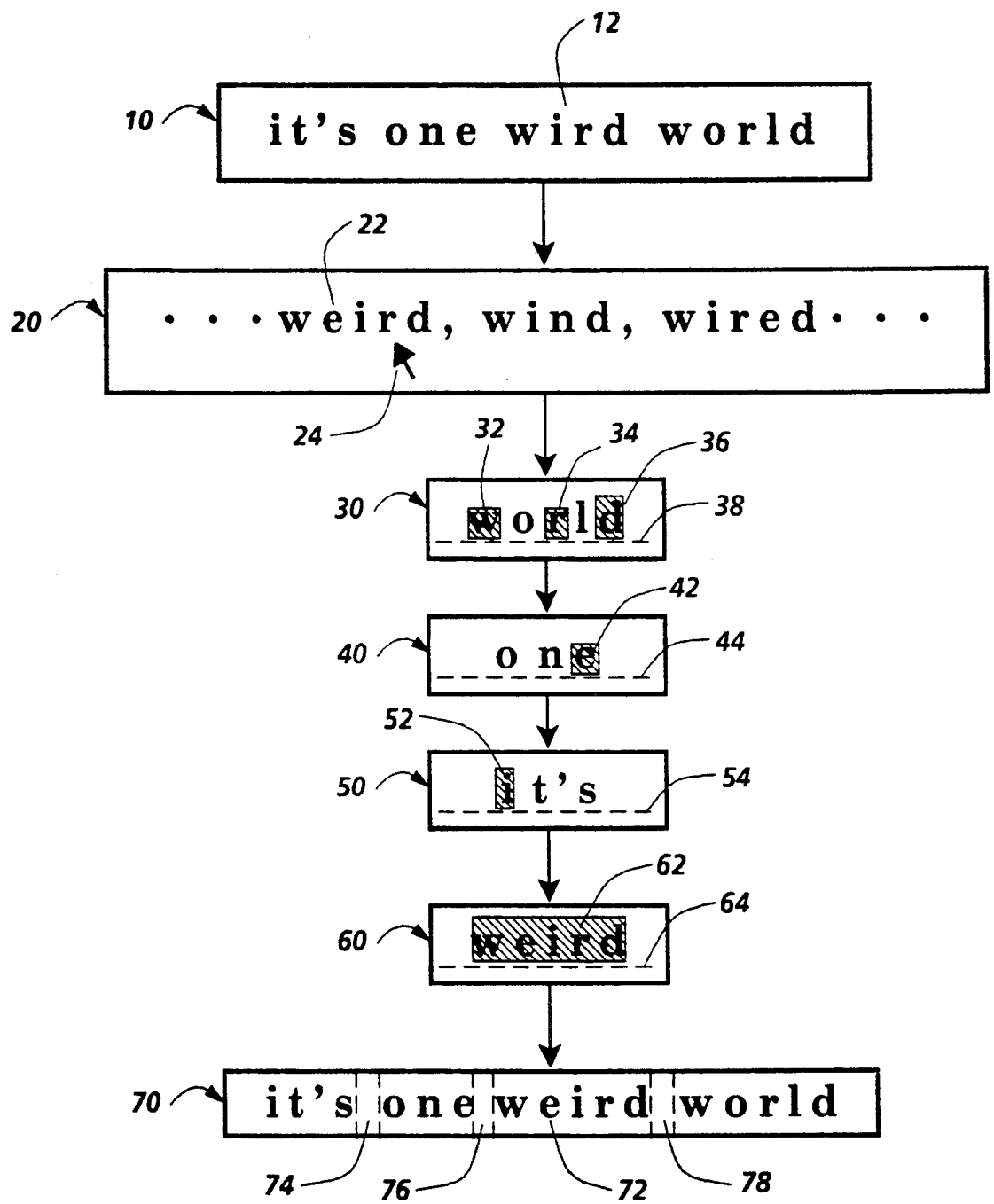
FIG. 1 is a flow chart showing stages in a spelling correcting operation by replacing a word with a new word formed of new characters according to the invention.

The following conceptual framework is helpfful in understanding the broad scope of the invention, and the terms defined below have the meanings indicated throughout this application, including the claims.

"Character" means a discrete element that apears in a writing system. Characters in the English language can thus include not only alphabetic and numerical elements, but also punctuation marks, diacritical marks, mathematical and logical symbols, and other elements used in writing English. More generally, characters can include, in addition to alphanumeric elements, phonetic, ideographic, or pictographic elements. A "character type" is a category of which a character may be an instance, such as the letter "a" or the number "3".

A "word" is a set of one or more characters that is treated as a semantic unit in a language. A "text" is an arrangement of one or more lines of characters; the characters of a text may form words.

An "image" is a pattern of light. An image may include characters, words, and text as well as other features such as graphics. A text may be included in a set of one or more images, such as in images of the pages of a document.

A "data structure" is any combination of interrelated items of data. An item of data is "included" in a data structure when it can be accessed using the locations or data of other items in the data structure; the included item of data may be another data structure. Conversely, as item of data can be "removed" from a data structure by rendering it inaccessible, such as by deleting it. An "array of data" or "array" is a data structure that includes items of data that can be mapped into an array. A "two-dimensional array" is a data array whose items of data can be mapped into an array having two dimensions.

Data or a data structure can be "obtained" or "produced" by any operations that result in the data or data structure. Data or a data structure can be "obtained from" or "produced from" other data or another data structure by operations that obtain or produce the data or data structure using the other data or using data in the other data structure. For example, an array can be obtained form another array by operations such as producing a smaller array that is the same as a part of the other array, producing a larger array that includes a part that is the same as the other array, copying the other array, or modifying data in the other array or in a copy of it.

Data "defines" an array when it includes data sufficient to obtain or produce the array. For example, data defining an array may include the defined array itself, a compressed or encoded form of the defined array, a pointer to the defined array, a pointer to a part of another array from which the defined array can be obtained, or pointers to a set smaller arrays from which the defined array can be obtained.

Data "defines" an image when the data includes sufficient information to produce the image. For example, a two-dimensional array can define all or any part of an image, with each item of data in the array providing a value indicating the color of a respective location of the image. If a two-dimensional array or other data defines an image that includes a character, the array or other data also defines the character. A "character-size array" is a two-dimensional array that defines only one character or character-size element.

Data defines a text "in image form" when the data defines a set of one or more images that together include the text. For example, the text may appear on a series of pages of a document, and may be defined in image form by data defining an image of each page of the document.

Each location in an image may be called a "pixel." In an array defining an image in which each item of data provides a value, each value indicating the color of a location may be called a "pixel value". Each pixel value is a bit in the "binary form" of the image, a grey-scale value in a "grey-scale form" of the image, or a set of color space coordinates in a "color coordinate form" of the image, the binary form, grey-scale form, and color coordinate form each being a two-dimensional array defining the image.

A "version" of a first image is a second image produced using data defining the first image. The second image may be identical to the first image, or it may be modified by loss of resolution, by changing the data defining the first image, or by other processes that result in a modified version. A "view" of an image is a version of the image that is displayed to a user; a view can omit some details of the image or can be otherwise modified.

A "connected component" or "blob" is a set of pixel values within a data array defining an image, all of which are connected to each other through an appropriate rule such as that they are neighbors of each other or are both neighbors of other members of the set. A connected component of a binary form of an image can include a connected set of pixel values that have the same binary value, such as black. A "connected component set" or "component set" is a set of connected components that are treated as a unit. A character can therefore be a component set; for example, the letter "i" includes two connected components that are treated as a single character in English text—the connected components "form" the character. A "bounding box" for a character or other component set is a rectangle just large enough to include all the pixel values in the component set, and can be specified by coordinates.

The data used to produce a modified version of an image that includes text can include information about a character in the text. "Identity information" about a character is information indicating its character type, case, typeface, point size, or the like. To "recognize" a character means to obtain identity information about the character from a two-dimensional array defining an image that includes the character. "Spatial information" about a character is information indicating its spatial characteristics, such as its size, shape, position, orientation, alignment with other characters, or the like. Although spatial information and identity information are not completely independent, spatial information about a character can be obtained from a two-dimensional array defining an image without recognizing the character.

A "data processing system" is a system that processes data. A "data processor" or "processor" is any component or system that can process data, and may include one or more central processing units or other processing components. An "image input device" is a device that can receive an image and provide a signal defining a version of the image. A "scanner" is an image input device that receives an image by a scanning operation, such as by scanning a document. A "user input device" is a device such as a keyboard or a mouse that can provide signals based on actions of a user. The data from the user input device may be a "request" for an operation, in which case the system may perform the requested operation in response. An "image output device" is a device that can provide an image as output. A "display" is an image output device that provides information in visual form, such as on the screen of a cathode ray tube.

A processor "accesses" a data structure by any operation that retrieves or modifies data included in the data structure, such as by reading or writing data at a location in memory that is included in the data structure. A processor can be "connected for accessing" a data structure by any combination of connections with local or remote memory or input/output devices that permits the processor to access the data structure.

A processor performs an opertaion or a function "automatically" when it performs the operation or function independent of concurrent human control.

B. General Features

Figure 2:
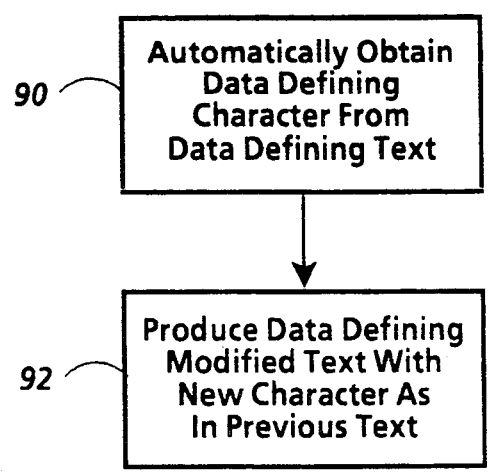
FIG. 2 is a flow chart showing general steps in providing a new character according to the invention.
Figure 3:
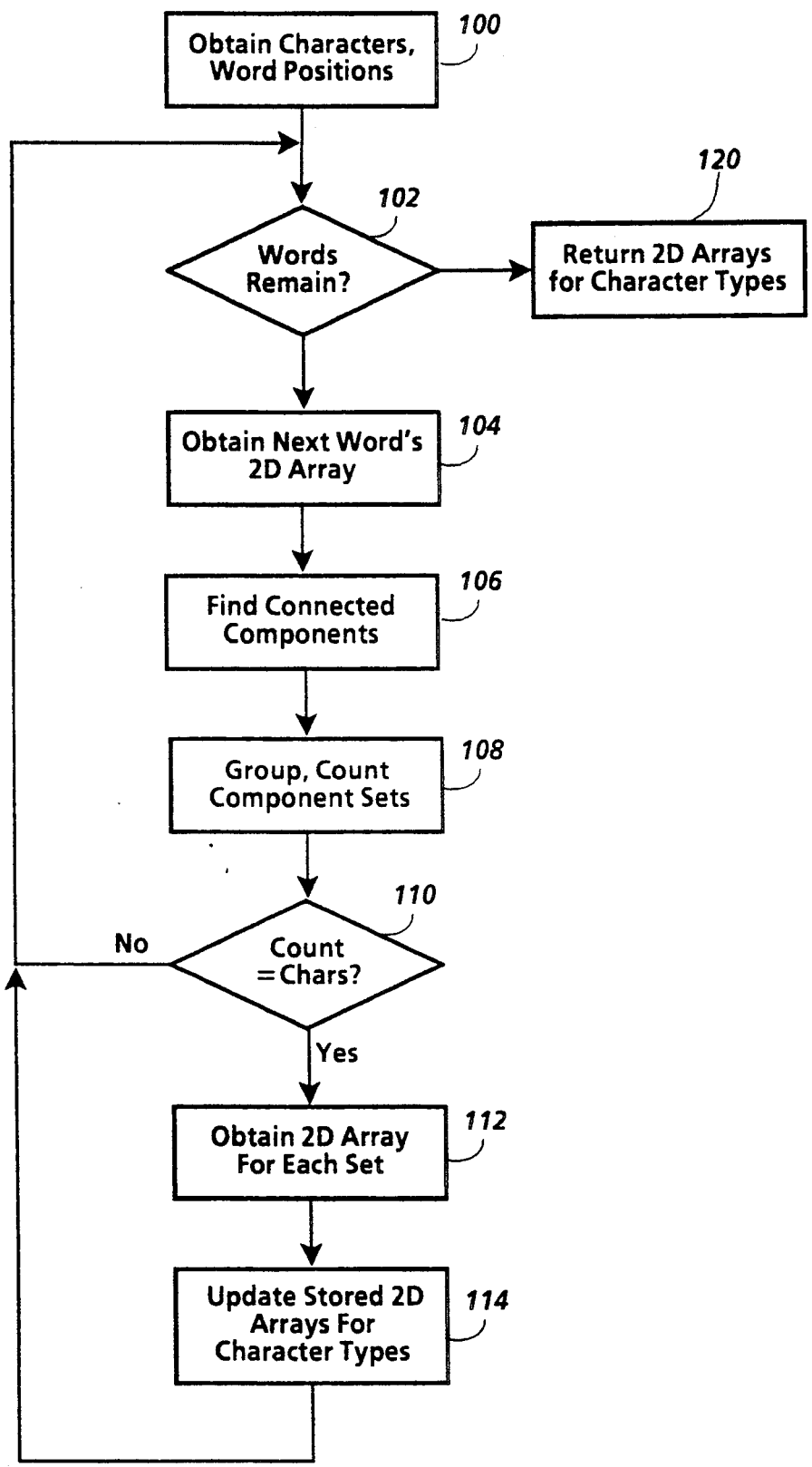
FIG. 3 is a flow chart showing in more detail how data defining a character can be obtained in FIG. 2.
Figure 4:
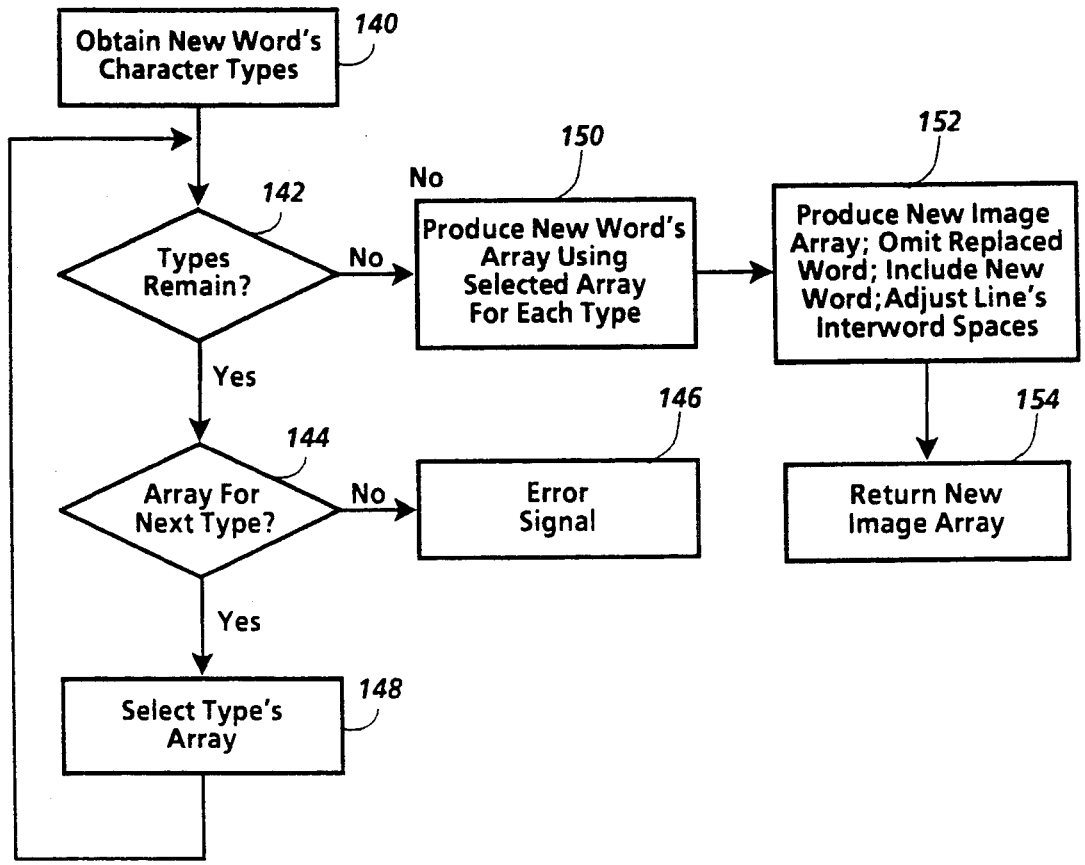
FIG. 4 is a flow chart showing in more detail how data defining a modified text with a new charaacter can be produced in FIG. 2.
Figure 5:
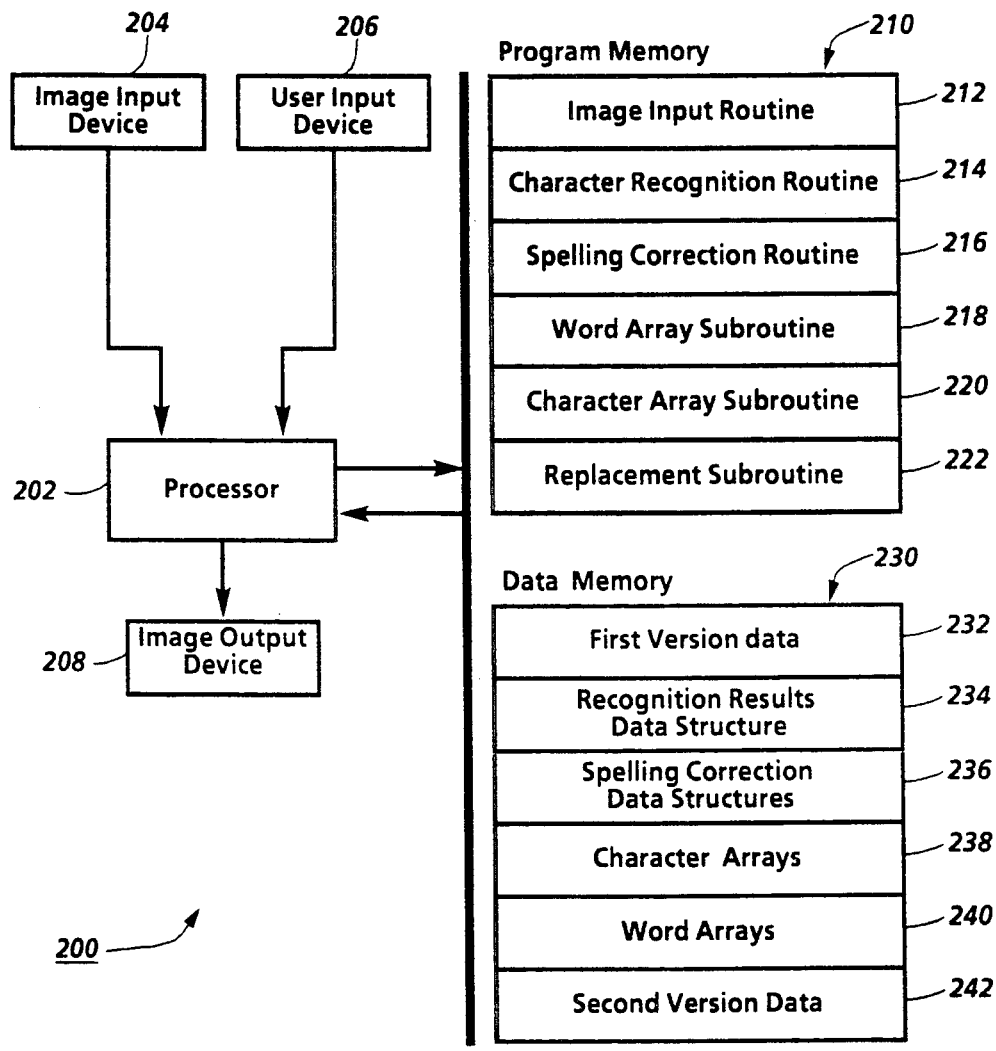
FIG. 5 is a block diagram showing components of a system for spelling correction by replacing a word with a new word formed of new characters according to th invention.

FIGS. 1-5 illustrate general features of the invention. FIG. 1 illustrates stages in a spelling correction operation that includes replacing a word with a new word formed of new characters. FIG. 2 shows general steps in providing a new character. FIG. 3 shows more detailed steps in obtaining data defining a new character. FIG. 4 shows more detailed steps in including a new character in data defining a modified version of a text in image form. FIG. 5 shows components of a system that can perform spelling correction by replacing a word with a new word formed of new characters.

Box 10 in FIG. 1 shows an image region that includes a line of text with the words "it's one wird world." This image region can be scanned to obtain a two-dimensional array of data in which each item of data is a binary value or other digital value indicating a respective location in the image region. Character recognition techniques can obtain information from the two-dimensional array including identity information indicating the identities of characters in the image region and spatial information such as the positions of characters, of words, and of lines of text in the image region. Furthermore, spell checking techniques can determine that word 12, spelled "wird," is misspelled word.

Upon determining that word 12 is incorrect, a number of alternative suggested correct spellings can be presented to a user on an image output device such as a display, as shown in box 20. The user can then provide a signal, with a user input device such as a mouse, indicating that one of the alternatives should replace the incorrect word. In box 20, the user selects word 22, spelled "weird," by positioning pointer 24 on it and providing an appropriate signal such as a mouse button click.

At this point, the system begins several automatic steps, each of which obtains data defining one or more of the characters of word 22 from the two-dimensional array defining the image region. The step in box 30 finds data defining character 32, a "w," data defining character 34, an "r," and data defining character 36, a "d." This step can also obtain spatial data for each character indicating its size and position in relation to baseline 38. Similarly, the step in box 40 finds data defining character 42, an "e," and can obtain spatial data indicating its size and position in relation to baseline 44, and the step in box 50 finds data defining character 52, an "i," and can obtain spatial data indicating its size and position in relation to baseline 54.

The system then uses the data found in boxes 30, 40, and 50 to obtain data defining the word selected in box 20, as shown in box 60. Data defining word 62 includes data defining the characters "w," "e," "i," "r," and "d" in substantially the same way as characters 32, 42, 52, 34, and 36, respectively, are defined. Data defining the characters could be included in a two-dimensinal array for the word such that the characters are appropriately positioned, both in relation to each other along the direction of the line and in relation to baseline 64 in a direction transverse to the line.

Finally, in the step shown in box 70, the system uses the data defining word 62 and the origial two-dimensional array to obtain data defining a modified version of the text in which word 12 has been replaced by word 72. The data defining the modified version of the text includes data defining word 72 in substantially the same way as it is defined by the data defining word 62. As part of this step, the system makes the necessary adjustments in interword spaces 74, 76, and 78 so that word 72 is appropriately spaced from adjacent words. The interword spaces may also be adjusted to maintain justification of the line of text.

The steps in FIG. 2 show more generally how a new character is provided according to the invention. The general step in box 90 automatically obtains data defining a character in the data defining a first version of a text in image form. This step can be performed by finding data defining the character in a two-dimensional array defining an image region that includes the text, as in boxes 30, 40, and 50 in FIG. 1, and by automatically obtaining a two-dimensionally array that defines the character or data defining such an array. The general step in box 92 produces data defining a second version of the text in image form, modified to include a new character. The step in box 92 uses the data defining the character so that the new character is defined in substantially the same way as the data found in box 90 defines the character that was previously present in the text, as in box 70 in FIG. 1.

FIG. 3 illustrates in more detail how the general step in box 90 could be performed automatically. The step in box 100 operates on data defining a text in image form to obtain identity data indicating the character types of characters in each word in the text and word spatial data indicating the position of each word. The step in box 102 then begins an iterative loop that handles words in the text; this loop can continue until it obtains one or more needed characters or until all the words have been handled. The words could be handled in an order that promotes efficiency, such as by starting with the words that have the largest number of the needed characters or by starting with the shortest words that include at least one of the needed characters.

The step in box 104 uses the word spatial data indicating the position of the next word and the data defining the text to obtain a two-dimensional array that defines the word. The step in box 106 then analyzes the word's two-dimensional array to find the connected components within it. The connected components are grouped into sets according to an appropriate rule and the component sets are counted in box 108. Rules for grouping connected components into sets are discussed in greater detail in coassigned, copending U.S. patent application Ser. No. 07/459,022, entitled "Editing Text in an Image" and incorporated herein by reference.

The test in box 110 determines whether the count of component sets from box 108 is the same as the number of characters indicated by the identity data obtained in box 1010. If not, at least one of the characters is likely to be poorly formed, so the characters are not used.

If the count is the same as the number of characters, the step in box 112 finds data defining each character in the word by obtaining a respective two-dimensional array that includes each component set from the word's two-dimensional array; this step also obtains character spatial data indicating the position of each character's respective two-dimensional array in relation to the word's baseline. The step in box 114 uses the identity data for the word to determine the character type of each character's two-dimensional array and updates the stored arrays for those character types; for example, the new array could be added to the stored arrays if it is different than all of them, or its spatial data could be used to indicate an additional occurrence of a previously encountered array that is substantially the same as the new array.

When all the words in the text have been handled in this manner, the step in box 120 returns the stored arrays for the character types. This step makes the arrays available for use in subsequent operations.

FIG. 4 illustrates in greater detail how the general step in box 92 in FIG. 2 could be performed by replacing a word in the text with a new word formed from new characters. The step in box 140 begins with the new word's character types. The step in box 142 begins an iterative loop that handles each of the types until a two-dimensional array defining the word has been produced.

For each type, the test in box 144 determines whether any character arrays are available for that type, such as stored arrays from the step in box 120 in FIG. 3. If no character arrays are available, the step in box 146 provides an error signal indicating that an array for the word could not be produced. But if character arrays are available, the step in box 148 selects an array that defines a character of that type that is suitable for the new word.

When an array for each of the types has been selected in this manner, the step in box 150 produces a two-dimensional array for the new word using the selected character arrays. The step in box 150 can be performed by including in the new word's array data defining each character in substantially the same way as it is defined by the selected character array. The data defining each character can be positioned within the new word's array so that the character is appropriately positioned in relation to the other characters of the word and in relation to a baseline.

When the new word's two-dimensional array is completed, the step in box 152 produces a new array defining an image that includes all or part of the modified version of the text. This step can include omitting data defining a word being replaced, including data defining the new word in substantially the same way as it is defined by its two-dimensional array, and positioning the data defining the new word and data defining other words in the same line to adjust the line's interword spaces. The step in box 154 then returns this new two-dimensional array as part of the data defining the modified version of the image.

FIG. 5 shows components of system 200 that can perform spelling correction by replacing a word with a new word formed of new characters as described above. System 200 includes processor 202, which could have any appropriate architecture. Processor 202 is connected for receiving signals from image input device 204, which could be a scanner, and user input device 206, which could be a keyboard with a mouse. Processor 202 is also connected for providing signals to image output device 208, which can include a display.

Processor 202 is also connected for accessing program memory 210 and data memory 230. Program memory 210 holds a number of routines executed by processor 202 in performing spelling correction with character insertion. Data memory 230 holds a number of data structures that are produced or used during execution of the routines in program memory 210.

In executing image input routine 212, processor 202 produces first version data 232 from signals received from image input device 204; first version data 232 includes data defining a first version of a text in image form. Processor 202 can execute character recognition routine 214 to obtain recognition results data structure 234, which can include identity data indicating the character types of characters in the text and spatial data indicating spatial information about the characters or words such as position, shape, and size. Processor 202 can execute spelling correction routine 216 using spelling correction data structures 236 to find misspelled words in recognition results data structure 234 and to present alternative correct words to the user for selection; spelling correction data structures 236 can include a word list or other data structure for checking spelling, rules or other data for generating a set of alternative correct words, and an image output data structure used in presenting the alternative correct words to the user with image output device 208.

When the user selects one of the correct words with user input device 206, spelling correction routine 216 can call word array subroutine 218, which in turn calls character array subroutine 220 to automatically obtain character arrays 238 including arrays for the characters in the selected correct word. Word array subroutine 218 then produces array 240 for the selected word. Spelling correction routine 216 can then call replacement subroutine 222 to produce second version data 242 defining a second version of the text that includes data defining the word as defined by the word's array 240.

C. An Implementation

Figure 6:
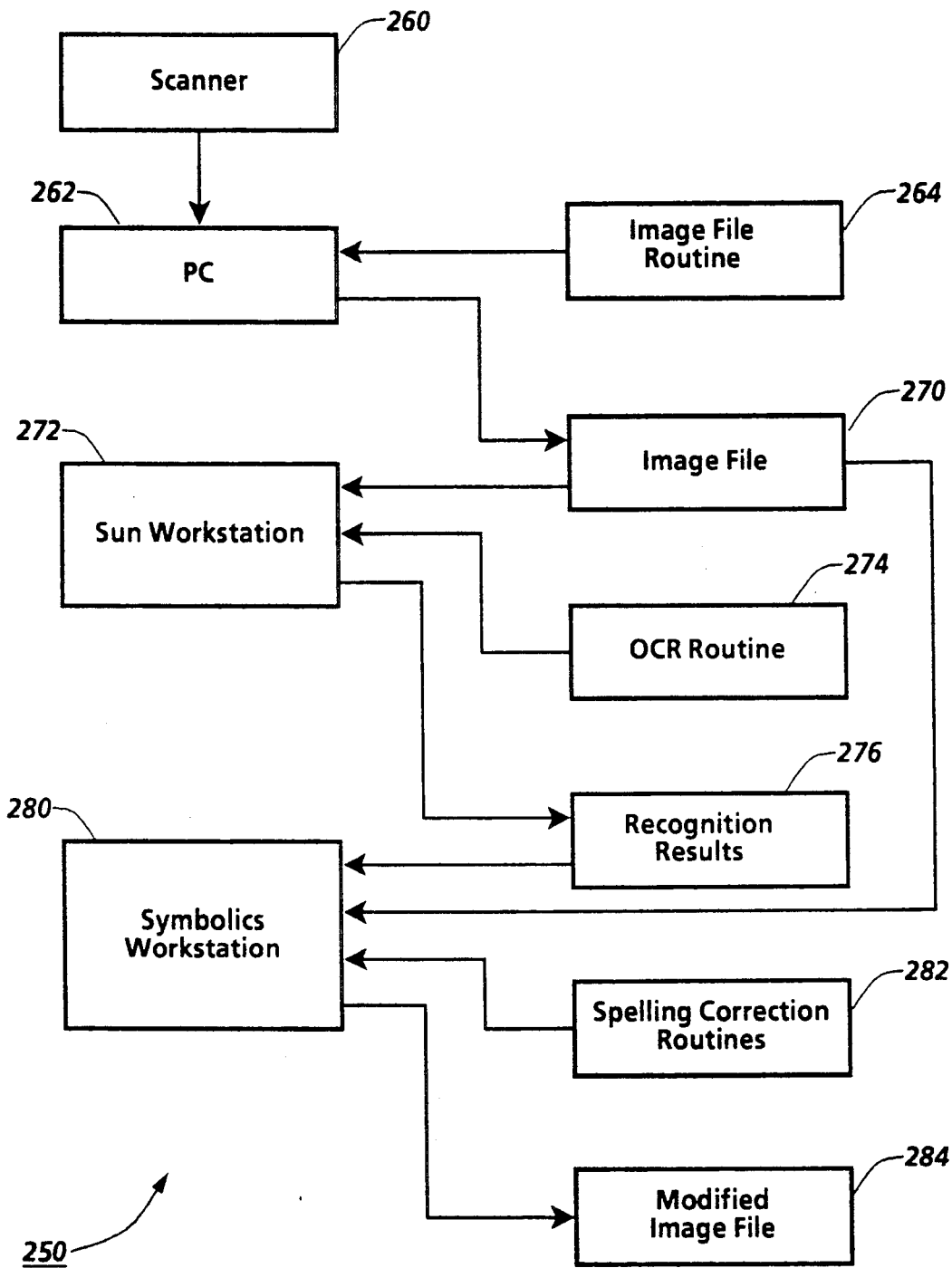
FIG. 6 is a block diagram showing components of a system according tp FIG. 5 in which the processor includes three subprocessors.
Figure 8:
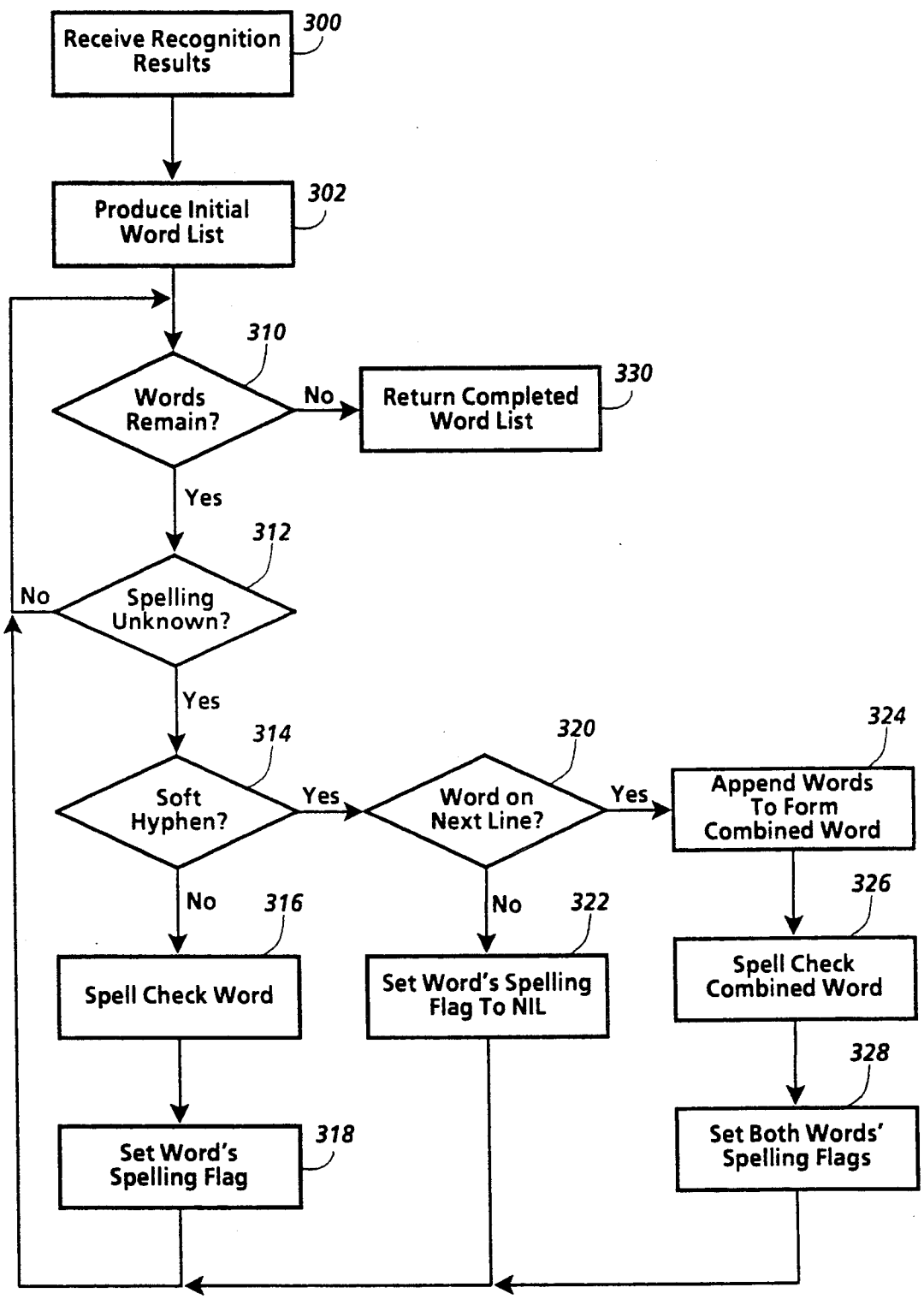
FIG. 8 is a flow chart showing steps in producing a word list data structure for use in spelling correction according to the invention.
Figure 9:
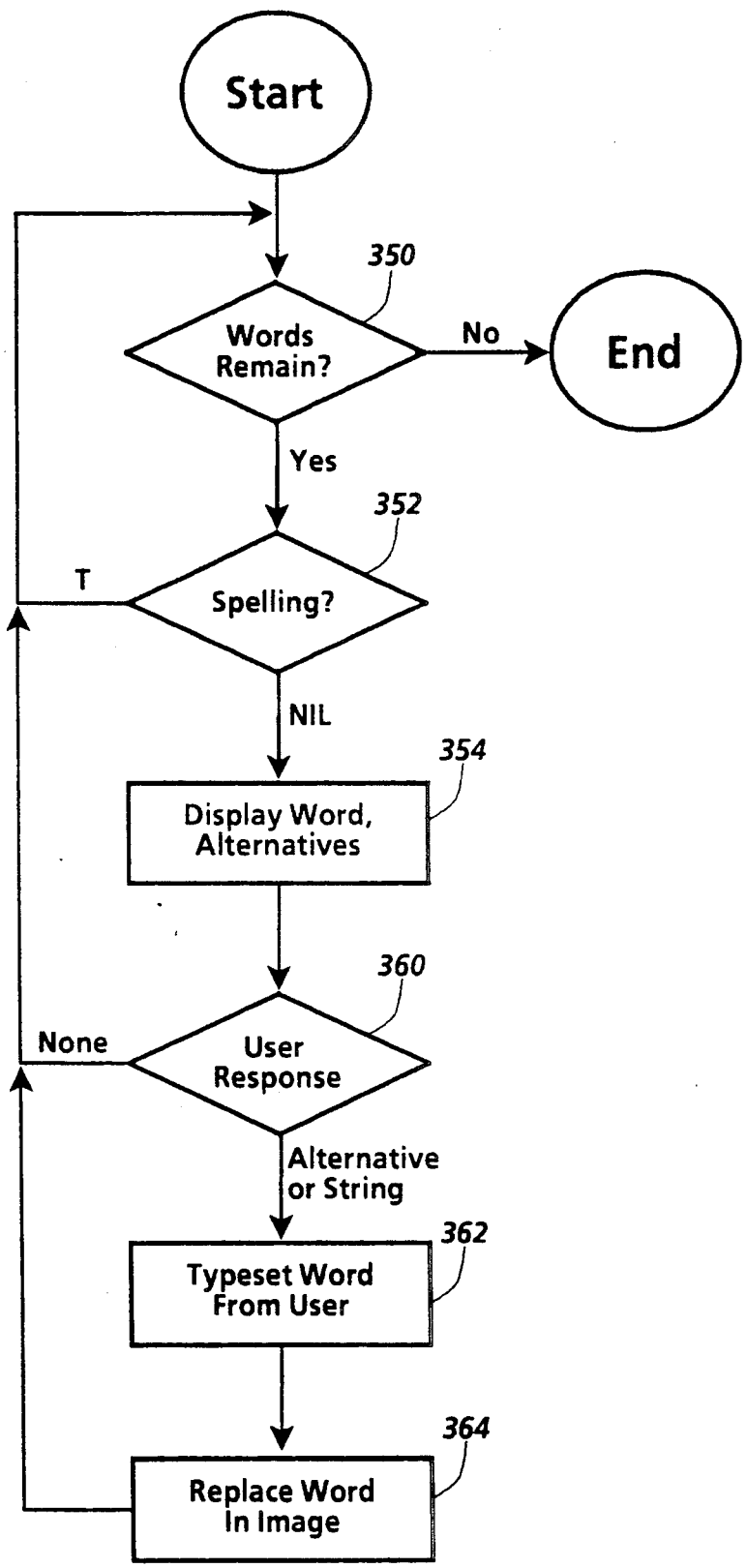
FIG. 9 is a flow chart showing steps in spelling correction according to the invention.
Figure 10:
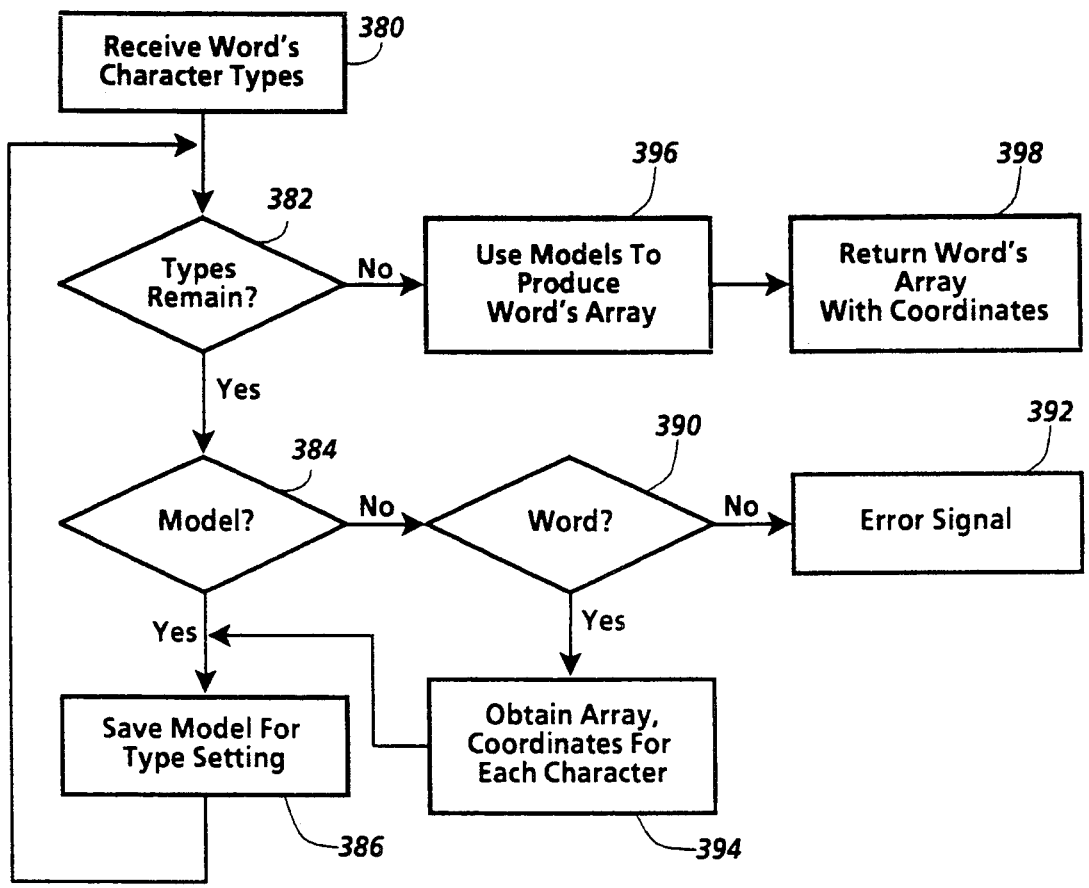
FIG. 10 is a flow chart flowing steps in typesetting a word in FIG. 9.
Figure 11:
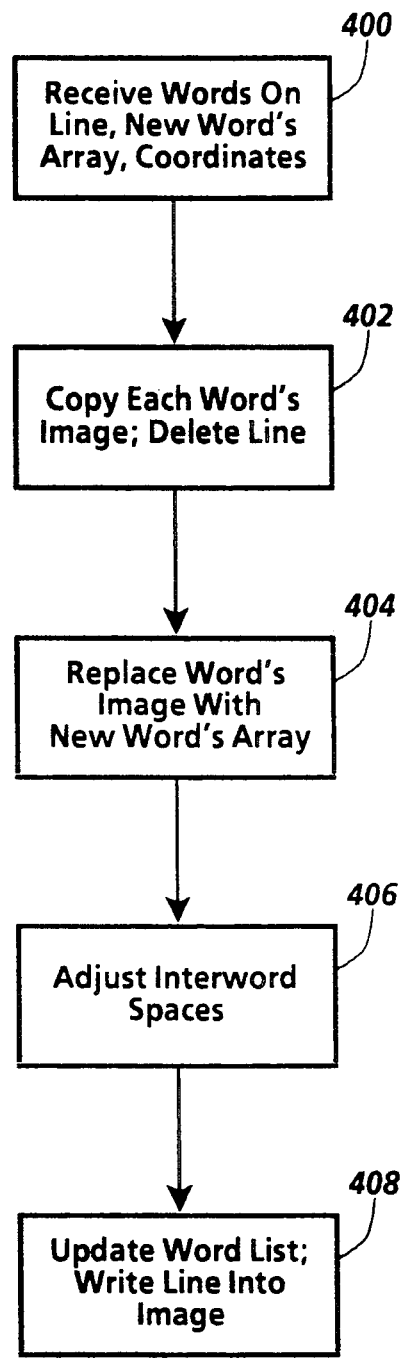
FIG. 11 is a flow chart showing steps in replacing a word in FIG. 9.

The invention could be implemented in many ways using a variety of processors. FIG. 6 shows components of a multiple processor implementation that takes advantage of software available for each processor. FIG. 7A shows an image of text, and FIG. 7B shows an image of the same text after spelling correction with the implementation of FIG. 6. FIG. 8 shows steps in producing a data structure for performing spelling correction based on recognition results. FIG. 9 shows steps in performing spelling correction using the data structure produced in FIG. 8. FIG. 10 shows steps in typesetting a word in FIG. 9. FIG. 11 shows steps in replacing a word in FIG. 9. System 250 in FIG. 6 includes scanner 260 connected to provide its output to PC 262. PC 262, which can be an IBM PC or a compatible processor, executes image file routine 264 to produce image file 270 defining a version of the image scanned, which could be a page of text, for example. Image file 270 can be in an appropriate format for subsequent processing.

Sun workstation 272 accesses image file 270 in executing OCR routine 274, and produces recognition results data structure 276. Recognition results 276 can include identity data indicating the character types in each word, word spatial data indicating the position of each word and the position of the word in relation to a baseline, and other data as provided in the UA format by Kurzweil or Accutext OCR software available from Xerox Imaging Systems, Sunnyvale, Calif.

Symbolics workstation 280 accesses image file 270 and recognition results 276 in executing spelling correction routine 282 to produce modified image file 284. FIGS. 7A and 7B show results obtained by Symbolics workstation 280 in the implementation of FIG. 6. FIG. 7A is a view of an image that includes text, with circled words 292, 294, and 296 misspelled. FIG. 7B is a view of a modified version of the image in FIG. 7A produced by Symbolics workstation 280, showing that words 292, 294, and 296 have been replaced with new, correctly spelled words formed from new characters defined by character arrays found elsewhere in the image.

The effectiveness of system 250 depends, or course, on a number of factors: The accuracy obtained with OCR routine 274 will determine whether the words being corrected are genuine misspellings or misspellings introduced by the recognition process. The power of spelling correction routine 282 will determine whether the potentially incorrect words are in fact incorrect and whether all incorrect words are detected. The contents of the scanned image will determine whether all the characters needed to provide a given correct word are available. The presence of more than one font on a page may result in the insertion of an inappropriate character unless the user is given an opportunity to approve the insertion before it is made or to select the best one of a number of available character arrays for insertion. Despite these limitations, FIGS. 7A and 7B show that system 250 can successfully correct incorrectly spelled words by replacing them with new words formed from new characters.

FIG. 8 shows steps taken by Symbolics workstation 280 in producing a data structure on which it can perform spelling correction. The step in box 300 receives recognition results 276 in a format such as the Kurzweil UA format. The step in box 302 produces from recognition results 276 an initial word list data structure that includes substantially all the information about each word that can be obtained from recognition results 276 except whether it is correctly spelled. The initial word list data structure includes a data unit for each word in the text.

The data unit for each word in the word list data structure can include respective fields for the word's string of characters, spatial data indicating the position and shape of the word's bounding box and the position and tilt of its baseline, a spelling flag indicating whether it is spelled correctly, a last word flag indicating whether it is the last word on a line, a soft hyphen flag indicating whether it is the start of a word that is hyphenated and extends to the next line, and pointers to the next word and the previous word. All of these fields except the spelling flag are filled in the step in box 302, and can be filled based on straightforward computations from recognition results 276. The spelling flag of each data unit can take one of three values—T, indicating that the word is correctly spelled; NIL, indicating that the word is incorrectly spelled; and UNKNOWN, indicating that the spelling flag has not yet been set. All of the spelling flags are initialized to the value UNKNOWN in the step in box 302.

The step in box 310 begins an iterative loop that handles each of the word data units in the initial word list from box 302. This loop begins with a test in box 312 that checks whether the spelling flag of the next word's data unit has the value UNKNOWN. If not, it has already been set, so that the routine proceeds to the next word by repeating the test in box 310. If the word's spelling flag has the value UNKNOWN, the routine branches in box 314 based on the word's soft hyphen flag.

If the soft hyphen flag indicates that the word does not extend to the next line, the step in box 316 calls a spell checking subroutine to check the spelling of the word. The spell checking subroutine can access a word list to determine whether the word is correctly spelled. The step in box 318 then sets the spelling flag to T or NIL based on the result returned by the spell checking subroutine.

If the soft hyphen flag indicates that the word does extend to the next line, the step in box 320 tests whether there is a word on the next line using the next word pointer of the word currently being handled. The spatial data field of the next word can be used to determine whether the next word is positioned on the next line from the word being handled. If there is no next word or if the next word is positioned so that it is not on the next line, the step in box 322 sets the spelling flag of the word currently being handled to NIL.

If there is a next word positioned on the next line, the step in box 324 appends the next word to the word currently being handled to form a combined word, and the step in box 326 calls the spell checking subroutine to check the spelling of the combined word. The step in box 328 then sets the spelling flags both of the word currently being handled and of the next word based on the result returned by the spell checking subroutine.

When all the words have been handled in this manner, the routine returns the completed word list data structure in box 330.

FIG. 9 shows steps performed by Symbolics workstation 280 in correcting spelling using the completed word list data structure from FIG. 8 and image file 270. The steps in FIG. 9 can be performed in response to a user request for spelling correction.

The step in box 305 begins an iterative loop that handles each word's data unit in the word list data structure. The step in box 352 branches based on the spelling flag of the word being handled. If the spelling flag indicates that the word is correctly spelled, the routine returns to the step in box 350 to handle the next word.

When a word is found whose spelling flag indicates that it is not correctly spelled, the step in box 354 calls a subroutine to obtain alternative spellings such as the function zwei:get-all-corrections in Symbolics Lisp. This function provides alternative spellings of a string of characters. The incorrect word and its alternative spellings are then presented to the user on the display. The step in box 360 then branches on the user's response. If the user provides no response, indicating that the word need not be changed, the routine returns to the step in box 350 to handle the next word.

When the user selects one of the alternative spellings or types in another spelling to replace the incorrect word, the step in box 362 prepares a two-dimensional array for the word indicated by the user. This step can be thought of as analogous to typesetting, because it is based on character arrays found elsewhere in the image. Then, the step in box 364 replaces the incorrect word with the newly typeset word to obtain a two-dimensional array defining a modified version of the image. This array can be stored in place of image file 270.

When all the words have been handled in this manner, the routine ends. At this point, the array in image file 270 can be printed, displayed, or stored, as appropriate to the user's needs.

FIG. 10 shows in more detail how a word is typeset in box 362 of FIG. 9. The routine of FIG. 10 is called with the character types of the word to be typeset, in box 380. The step in box 382 begins an iterative loop that handles each of the character types.

The step in box 384 begins the iterative loop by testing whether the previous operations have saved a two-dimensional array and coordinate data, referred to in FIG. 10 as a "model," for the character type being handled. If so, the step in box 386 saves the model for subsequent use in typesetting, selecting from the models for that character type if more than one have been saved. If no models are saved, the step in box 390 calls a subroutine resembling that in FIG. 3 to find a word that includes an instance of the character type.

The subroutine called in box 390 can begin by finding all the words in the word list data structure that it has not previously handled. The unhandled words could be sorted according to whether they include the character type being handled or in other ways to optimize the operation, such as by sorting the words according to the number of the needed character types they contain. Then each word could be handled as in boxes 104, 106, 108, and 110 in FIG. 3 until one is found for which the number of connected component sets equals the number of characters. If no such word can be found, the step in box 392 provides an error signal. But when such a word is found, the step in box 394 obtains a model for each of its character types, including the character type being handled, by saving a two-dimensional array and coordinate data for each character in the word. The coordinate data for each character's two-dimensional array can be obtained using the word's bounding box coordinates and baseline data. The model for the character type being handled is then saved for typesetting box 386.

When a model has been saved for each character type, the step in box 396 uses the models and data about the word being replaced to produce the new word's two-dimensional array. This can be done, for example, by first setting up an empty array of the correct size. The position of each charcter's array in the word's array can then be calculated, and the character arrays can be copied into the empty array to produce the word array.

The width of the empty array can be determined based on the widths of the character arrays and of the intercharacter spaces. The spacing between characters can be obtained from the word being replaced, using a tight bounding box; the width of the models for the characters in the word being replaced can be added to obtain a total character width, and the difference between the bounding box width and the total character width can be divided by the number of intercharacter spaces to obtain an intercharacter space width for the new word.

The height of the empty array can be determined using the maximum height above baseline of the character arrays, which is also used to determine the height above baseline of the word, and the maximum total height of the character arrays, adjusting for the replaced word's tilt as indicated by its coordinate data.

When the word's array is produced, it is returned, together with its coordinate data, in box 398. The coordinate data for the new array can include its width, its height, height from baseline, and the position of each character within it. The new array and its coordinate data can then be used in a replacement operation.

FIG. 11 shows in more detail how a word is replaced in box 364 of FIG. 9. The step in box 400 receives a call that includes the part of the word list data structure that defines the line with the word to be replaced. This part of the data structure can be obtained based on the end of line flags. The call also includes data indicating which word is to be replaced, and the new words's array and coordinate data.

Using the spatial data from the word list data structure, the step in box 402 accesses the image file and copies the data defining each word on the line into a respective slot in a word copy data structure. Then, this step deletes the data defining each word on the line, which can be done by a BitBlt operation that loads white into the part of the image file in the word's bounding box.

The step in box 404 then replaces the word being replaced in the word copy data structure, putting into its respective slot the array of the new word. The step in box 406 adjusts the interword spaces to accommodate the new word, by determining the excess width in the line and spreading it equally among the interword spaces by changing the spatial data of the words on the line. Then the step in box 408 goes through the part of the word list data structure and the word copy data structure, updating the word list data structure for each word on the line and including the array for each word in the image file, which can be done by a BitBlt operation for each word. The result is a data structure in the image file that defines a modified version of the image in which the new word has been included by replacement.

The implementation described above can also include a preliminary test of whether a word identified as misspelled is misrecognized. This can be done by obtaining models for each character of the word as recognized and convolving them with their approximate locations in the image. If at least one of the models does not match the image, because its convolution score is below a threshold, this indicates that the recognizer made a mistake, and the word can be treated as correctly spelled in the image. Convolution here means an operation of holding a binary mask at a particular alignment with a binary imatge and summing the number of black/black and white/white correspondences to obtain a score. This can be repeated at many possible alignments, and the best score can then be used.

If a character is needed for which no model is available, perhaps because it does not occur in the image, it may be possible to use a stored letter model, perhaps degraded to eliminate distinguishing features of its font, or to somehow synthesize a model from pieces of other letters found in the image.

The invention could be implemented in a copying maching to provide a spelling correction capability. Rather than presenting alternative spelling corrections on an electronic display, they might be printed on paper; the user could then select one by marking it or the other alternatives appropriately and by feeding the paper back into the machine for recognition of which alternative was selected. The user could cross out the non-selected alternatives or circle or highlight the selected alternative. This technique would eliminate the need for additional user interface devices such as a CRT, keyboard, and mouse.

The word list used in checking spelling could be specialized to the user of the copier, and a learning mode could be provided by which the user could construct a specialized word list. Adaptive spelling correction techniques are described in Duncan, IV et al., U.S. Pat. No. 4,797,855, incorporated herein by reference.

A set of permanently stored fonts could be used in conjunction with the invention, so that characters from the permanently stored fonts could be included in an image when appropriate. For example, all the characters in an image could be replaced by characters from one of the stored fonts.

D. Miscellaneous

Many other variations are apparent from the above description.

The invention might be implemented by copying a character directly from the two-dimensional array defining a first version of a text in image form into an array defining a second version of the text, making it unnecessary to store a two-dimensional array of each character.

Before presenting alternative spellings of a misspelled word, a system according to the invention might check first whether each alternative could be produced from available character models. An alternative that could not be produced need not be presented to the user.

The invention might be used with character recognition software that provides data indicating each character's position. The character position data could then be used to allow character replacement. This might be problematic, however, for characters with overlapping bounding boxes and for poorly formed characters.

Rather than modifying the array stored in the image file, the invention might be implemented to produce a data structure with pointers into the image file. This data structure would define a modified version of the text.

The invention might be applied to a text that spans several pages, such as the text of a document. Specifically, a character might be found on one page and used to add a new character on another page.

The invention has been described in terms of replacing a word in a text or replacing a line of text with a line of the same width. The invention might also be implemented to replace a number of lines to the end of a paragraph or the end of a page, or to replace all the lines on a page where a change in the text requires it. The invention might also be implemented to hyphenate a word where necessary.

The invention has been described in relation to English text, but could be implemented for text of many other languages.

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

What is claimed is:

1. A method of operating a processor connected for accessing first text image data defining a first version of a text in image form, the first version of the text including a first character that is an instance of a first character type; the method comprising the steps of:
    operating on the first text image data to automatically obtain first character data defining the first character in substantially the same way as the first character is defined by the first text image data; and
    using the first text image data and the first character data to produce second text image data, the second text image data defining a second version of the text in image form, the second version of the text including a second character that is an instance of the first character type, the second charcter not appearing in the first version of the text, the step of using the first text image data and the first character data comprising the substep of using the first character data to produce the second text image data so that the second character is defined by the second text image data in substantially the same way as the first character is defined by the first character data.

2. The method of claim 1 in which the first character data is data defining a two-dimensional array that defines the first character in substantially the same way as it is defined by the first text image data.

3. The method of claim 2 in which the first character data includes the two-dimensional array, the two-dimensional array being a character-size two-dimensional array.

4. The method of claim 1 in which the first text image data includes image data defining a first version of an image, the first version of the image including the first character, the second text image data including data defining a second version of the image, the second version of the image including the second character.

5. The method of claim 4 in which the image includes a page of the text.

6. The method of claim 4 in which the first text image data includes a first version two-dimensional array defining the first version of the image and the second text image data includes a second version two-dimensional array defining the second version of the image.

7. The method of claim 6 in which the step of using the first text image data and the first character data to produce second text image data comprises the substep of modifying the first version two-dimensional array to produce the second version two-dimensional array.

8. The method of claim 7 in which the first character data includes a first character two-dimensional array that defines the first character in substantially the same way as it is defined by the first text image data, the substep of modifying the first version two-dimensional array comprising using the first character two-dimensional array to modify the first version two-dimensional array.

9. The method of claim 2 in which the step of operating on the first text image data to automatically obtain the first character data comprises the substep of automatically obtaining a first character two-dimensional array that defines the first character in substantially the same way as it is defined by the first text image data from the first text image data.

10. The method of claim 9 in which the first version of the text includes a correctly spelled word, the correctly spelled word including the first character, the substep of automatically obtaining the first character two-dimensional array comprising the substeps of:
    automatically obtaining an intermediate two-dimensional array of data defining the correctly spelled word in substantially the same way as it is defined by the first text image data; and
    automatically obtaining the first character two-dimensional array from the intermediate two-dimensional array.

11. The method of claim 10 in which the substep of automatically obtaining the first character two-dimensional array from the intermediate two-dimensional array comprises the substeps of finding connected components in the intermediate two-dimensional array, grouping the connected components into a number of sets, and determining whether the number of sets is equal to a number of characters in the correctly spelled word.

12. The method of claim 10 in which the step of operating on the first text image data further comprises accessing the first text image data to obtain position data indicating a position of the correctly spelled word and character data indicating a character type of each character in the correctly spelled word; the substep of automatically obtaining the intermediate two-dimensional array including using the position data; the substep of automatically obtaining the first character two-dimensional array including using the character data.

13. The method of claim 1 in which the second version of the text includes a new word that includes the second character and that is not in the first version of the text, the step of using the first text image data and the first character data to produce second text image data further comprising the substeps of:
producing a new word two-dimensional array that defines the new word, the new word two-dimensional array defining the second character in substantially the same way as the first character is defined by the first character data; and
producing the second text image data so that it defines the new word in substantially the same way as the new word is defined by the new word two-dimensional array.

14. The method of claim 13 in which the first version of the text includes an old word, the substep of producing the second text image data further comprising the substep of omitting the old word so that the new word replaces the old word.

15. The method of claim 14, further comprising the step of determining that the old word is incorrect and that the new word should replace it.

16. The method of claim 15 in which the first text image data includes a first version two-dimensional array defining the first version of the text, the determining step comprising the substep of accessing the first text image data to obtain recognition result data from the first version two-dimensional array, the recognition result data including character data indicating character types of characters of the old word, the determining step further comprising the substep of performing spelling checking on the character data to determine that the old word is incorrect.

17. The method of claim 15 in which the processor is further connected for providing image output data to an image output device having a display, the image output device presenting views on the display based on the image output data, the processor further being connected for receiving user input data from a user input device, the determining step comprising the substeps of:
providing image output data to the image output device so that the image output device presents a view of the new word on the display; and
receiving user input data from the user input device indicating whether the new word should replace the old word.

18. The method of claim 13 in which the second version of the text includes a line that includes a plurality of words including the new word, the step of using the first text image data and the first character data to produce second text image data further comprising the substeps of:
obtaining a line two-dimensional array that defines the line, the line two-dimensional array defining the new word in substantially the same way as the new word is defined by the new word two-dimensional array, the line two-dimensional array defining the line with interword spaces separating the words in the line; and
producing the second text image data so that it defines the line in substantially the same way as the line is defined by the line two-dimensional array.

19. The method of claim 1 in which the first version of the text includes a third character that is an instance of a second character type, the second version of the text including a fourth character that is an instance of the second character type, the step of operating on the first text image data further comprising automatically obtaining third character data defining the third character in substantially the same way as it is defined by the first text image data, the step of using the first image data and the first character data to produce second text image data further comprising producing the second text image data so that it defines the fourth character in substantially the same way as the third character is defined by the third character data.

20. The method of claim 1 in which the first version of the text includes a plurality of characters that are instances of the first character type, the plurality of characters including the first character, the step of operating on the first text image data comprising the substeps of:
automatically obtaining respective character data defining each of the plurality of characters that are instances of the first character type; and
automatically selecting the first character data from the respective character data for the plurality of characters.

21. The method of claim 1 in which the step of operating on the first text image data comprises obtaining spatial data indicating spatial information about the first character, the substep of producing the second text image data comprising using the spatial data to position the second character within the second version of the text.

22. The method of claim 1 in which the processor is further connected for receiving image input data from an image input device, the method further comprising:
receiving the image input data from the image input device; and
obtaining the first text image data from the image input data.

23. A method of operating a processor connected for accessing first text image data defining a first version of a text in image form, the text including a first word; the method comprising the steps of:
operating on the first text image data to produce second word array data defining a second word two-dimensional array that defines a second word; and
using the first text image data and the second word array data to produce second text image data defining a second version of the text in image form, the text being modified in the second version so that the second word replaces the first word, the second word being defined by the second text image data in substantially the same way as it is defined by the second word two-dimensional array.

24. The method of claim 23 in which the first text image data includes a first version two-dimensional array defining a first version of an image and the second text image data includes a second version two-dimensional array defining a second version of an image, the first version of the image including the first word, the second version of the image including the second word.

25. The method of claim 24 in which the text includes a plurality of pages, the image including one of the pages.

26. The method of claim 23 in which the first word includes a first plurality of characters and the second word includes a second plurality of characters, the method further comprising the step of obtaining spatial data indicating intercharacter spacing of the first plurality of characters; the step of operating on the first text image data to produce the second word array data comprising producing the second word array data so that the second plurality of characters are defined by the second word two-dimensional array with the intercharacter spacing indicated by the spatial data.

27. The method of claim 23 in which the first version of the text includes a first character that is an instance of a first character type, the second word including a second character that is an instance of the first character type, the step of operating on the first text image data to produce the second word array data comprising the substeps of:
  obtaining first character data defining the first character in substantially the same way as it is defined by the first text image data; and
  producing the second word array data so that the second character is defined in substantially the same way as the first character is defined by the first character data.

28. The method of claim 27 in which the first character is in a first line of the first version of the text, the substep of obtaining the first character data comprising the substep of obtaining spatial data indicating a position of the first character in a direction transverse to the first line, the substep of producing the second word array data comprising the substep of using the spatial data to position the second character.

29. The method of claim 23 in which the second version of the text includes a second line that includes a plurality of words including the second word, the step of using the first text image data and the second word array data to produce second text image data comprising the substeps of:
  producing second line array data defining a second line two-dimensional array that defines the second line, the second line two-dimensional array defining the second word in substantially the same way as the second word is defined by the second word two-dimensional array, the second line two-dimensional array defining the second line with interword spaces separating the words in the line; and
  producing the second text image data so that the second text image data defines the second line in substantially the same way as the second line is defined by the second line two-dimensional array.

30. The method of claim 23, further comprising the step of determining that the first word is incorrect and that the second word should replace it.

31. The method of claim 30 in which the determining step comprises the substep of accessing the first text image data to obtain recognition result data from the first text image data, the recognition result data including character data indicating character types of characters of the first word, the determining step further comprising the substep of performing spelling checking on the character data to determine that the first word is incorrect.

32. The method of claim 30 in which the processor is further connected for providing image output data to an image output device having a display, the image output device presenting views on the display based on the image output data, the processor further being connected for receiving user input data from a user input device, the determining step comprising the substeps of:
  providing image output data to the image output device so that the image output device presents a view of the second word on the display; and
  receiving user input data from the user input device indicating whether the second word should replace the first word.

33. The method of claim 23 in which the second word array data includes the second word two-dimensional array.

34. A system comprising:
  first text image data defining a first version of a text in image form, the text including a first character that is an instance of a first character type; and
  a processor connected for accessing the first text image data, the processor operating to access the first text image data to obtain first character data that defines the first character in substantially the same way as it is defined by the first text image data, the processor obtaining the first character data automatically; the processor further operating to produce second text image data, the second text image defining a second version of the text in image form the second version of the text including a second character that is an instance of the first character type, the second character not appearing in the first version of the text, the processor producing the second text image data so that the second character is defined by the second text image data in substantially the same way as the first character is defined by the first character data.

35. The system of claim 34, further comprising an image input device for providing image input data, the processor further being connected for receiving the image input data, the processor comprising a first subprocessor for obtaining the first text image data from the image input data and a second subprocessor for producing the second text image data from the first text image data.

36. The system of claim 35 in which the processor further comprises a third subprocessor for accessing the first text image data to obtain recognition result data, the recognition result data including character data indicating character types of characters in the text and position data indicating positions of characters in the text the second subprocessor accessing the recognition results data and using the character data and position data in obtaining the second text image data.

37. A method of operating a processor connected for accessing first text image data defining a first version of a text in image form, the first version of the text including a first character that is an instance of a first character type; the method comprising of:
  determining to modify the first version of the text by inserting an additional part that includes an instance of the first character type;
  operating on the first text image data to automatically obtain first character data defining the first character in substantially the same way as the first character is defined by the first text image data;

using the first character data to produce a two-dimensional array that defines the additional part; the two-dimensional array defining, within the additional part, a second character that is an instance of the first character type; the two-dimensional array defining the second character in substantially the same way as the first character is defined by the first character data; and using the first text image data and the two-dimensional array to produce second text image data, the second text data defining a second version of the text in image form; the second version of the text including the additional part; the second text image data defining the additional part in substantially the same way as the additional part is defined by the two-dimensional array.

38. The method of claim 37 in which the additional part is a word.

39. A method of operating a processor connected for accessing first text image data defining a first version of a text in image form, the first version of the text including a first character that is an instance of a first character type; the first version of the text further including a first word; the method comprising acts of:

determining that a second word that is not in the first version of the text should replace the first word; the second word including an instance of the first character type;

operating on the first text image data to automatically obtain first character data defining the first character in substantially the same way as the first character is defined by the first text image data;

using the first character data to produce a second word two-dimensional array that defines the second word; the second word two-dimensional array defining, within the second word, a second character that is an instance of the first character type; the second word two-dimensional array defining the second character in substantially the same way as the first character is defined by the first character data; and using the first text image data and the second word two-dimensional array to produce second text image data, the second text image data defining a second version of the text in image form; the second version of the text further omitting the first word and instead including the second word so that the second word replaces the first word in the second version of the text; the second text image data defining the second word in substantially the same way as the second word is defined by the second word two-dimensional array.

40. A method of operating a processor connected for accessing first text image data defining a first version of a text in image form, the first version of the text including a first character that is an instance of a first character type; the first version of the text further including a first word; the method comprising of:

operating on the first text image to determine that the first word is incorrect; determining that a second word that is not in the first version of the text should replace the first word, the second word including an instance of the first character type;

operating on the first text image data to automatically obtain first character data defining the first character in substantially the same way as the first character is defined by the first text image data;

using the first character data to produce a second word two-dimensional array that defines the second word; the second word two-dimensional array defining, within the second word, a second character that is an instance of the first character type; the second word two-dimensional array defining the second character in substantially the same way as the first character is defined by the first character data; and using the first text image data and the second word two-dimensional array to produce second text image data, the second text image data defining a second version of the text in image form; the second version of the text further omitting the first word and instead including the second word so that the second word replaces the first word in the second version of the text; the second text image data defining the second word in substantially the same way as the second word is defined by the second word two-dimensional array.

* * * * *